(12) United States Patent
Muldoon et al.

(10) Patent No.: US 11,725,580 B2
(45) Date of Patent: Aug. 15, 2023

(54) TURBINE OVER-SPEED BRAKE FOR HYBRID ELECTRIC GAS TURBINE ENGINE

(71) Applicant: Raytheon Technologies Corporation, Farmington, CT (US)

(72) Inventors: Marc J. Muldoon, Marlborough, CT (US); Michael D. Greenberg, Bloomfield, CT (US); Nancy Poisson, Avon, CT (US); Martin Richard Amari, Glastonbury, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/351,876

(22) Filed: Jun. 18, 2021

(65) Prior Publication Data

US 2022/0403776 A1 Dec. 22, 2022

(51) Int. Cl.
*F02C 9/28* (2006.01)
*F02C 6/20* (2006.01)
*B64D 27/24* (2006.01)
*B64D 27/12* (2006.01)

(52) U.S. Cl.
CPC .............. *F02C 6/206* (2013.01); *B64D 27/12* (2013.01); *B64D 27/24* (2013.01); *F02C 9/28* (2013.01); *F05D 2220/323* (2013.01); *F05D 2270/021* (2013.01)

(58) Field of Classification Search
CPC .. F05D 2270/02; F05D 2270/021; F02C 7/32; F02C 7/36; F02C 9/28; F02C 9/32; F02C 9/44
See application file for complete search history.

(56) References Cited

U.S. PATENT DOCUMENTS

| 7,188,475 | B2 * | 3/2007 | McGinley | F02C 7/275 |
| | | | | 60/726 |
| 8,159,081 | B2 * | 4/2012 | Gainford | F01D 21/02 |
| | | | | 290/40 C |
| 10,006,375 | B1 | 6/2018 | Wagner et al. | |
| 10,263,552 | B2 * | 4/2019 | Noderer | H02P 29/0016 |
| 11,035,300 | B2 * | 6/2021 | Smith | F02C 9/00 |
| 11,143,113 | B2 * | 10/2021 | Kopeschka | F02C 9/48 |
| 2012/0221157 | A1 * | 8/2012 | Finney | F02C 7/32 |
| | | | | 700/287 |
| 2017/0138271 | A1 * | 5/2017 | Negroni | F01D 21/02 |
| 2020/0131995 | A1 | 4/2020 | Trawick | |
| 2020/0149480 | A1 | 5/2020 | Bacic | |
| 2020/0392909 | A1 * | 12/2020 | Turner | F02C 9/42 |

* cited by examiner

*Primary Examiner* — Todd E Manahan
*Assistant Examiner* — Thuyhang N Nguyen
(74) *Attorney, Agent, or Firm* — Cantor Colburn LLP (57) ABSTRACT

An engine system of an aircraft includes a gas turbine engine comprising at least one spool and at least one electric machine operably coupled with the at least one spool. A controller is configured to detect if the at least one spool of the gas turbine engine is in or is approaching an overspeed condition and apply a load to the at least one spool via the at least one electric machine.

17 Claims, 7 Drawing Sheets

TURBINE OVER-SPEED BRAKE FOR HYBRID ELECTRIC GAS TURBINE ENGINE

BACKGROUND

Exemplary embodiments of the present disclosure pertain to the art of rotating machinery and, more particularly, to a system and method for limiting overspeed of the rotational machinery.

A typical turbofan engine includes a low pressure turbine that drives a fan and a low pressure compressor through a low spool shaft and a high pressure turbine that drives a high pressure compressor via a high spool shaft. If a failure associated with operation of the engine occurs, there is a risk that a portion of one of the low and high spools will accelerate beyond its maximum rotational speed. It is therefore desirable to reduce the rotational speed of an engine spool during an engine overspeed condition to prevent damage.

BRIEF DESCRIPTION

According to an embodiment, an engine system of an aircraft includes a gas turbine engine comprising at least one spool and at least one electric machine operably coupled with the at least one spool. A controller is configured to detect if the at least one spool of the gas turbine engine is in or is approaching an overspeed condition and apply a load to the at least one spool via the at least one electric machine.

In addition to one or more of the features described above, or as an alternative to any of the foregoing embodiments the controller is further configured to monitor a parameter of the at least one spool and compare the parameter of the at least one spool to an overspeed threshold.

In addition to one or more of the features described above, or as an alternative to any of the foregoing embodiments the parameter is a rotational speed of the at least one spool.

In addition to one or more of the features described above, or as an alternative to any of the foregoing embodiments the parameter is a rate of acceleration of the at least one spool.

In addition to one or more of the features described above, or as an alternative to any of the foregoing embodiments application of the load to the at least one spool is performed when the parameter is equal to or exceeds the overspeed threshold.

In addition to one or more of the features described above, or as an alternative to any of the foregoing embodiments the at least one electric machine is configurable between a motor mode and a generator mode, and the at least one electric machine is configured to apply the load to the at least one spool when in the generator mode.

In addition to one or more of the features described above, or as an alternative to any of the foregoing embodiments the at least one spool includes a low spool and a high spool and the at least one electric machine includes a low spool electric machine operably coupled to the low spool, and a high spool electric machine operably coupled to the high spool.

In addition to one or more of the features described above, or as an alternative to any of the foregoing embodiments the controller is further configured to connect at least one energy sink to the at least one electric machine to apply the load to the at least one spool.

In addition to one or more of the features described above, or as an alternative to any of the foregoing embodiments the at least one energy sink includes one or more of a battery, a capacitor, and an anti-ice/deicing system.

According to an embodiment, a method for limiting overspeed of a spool of a gas turbine engine includes measuring a parameter of the spool, determining if the spool is in an overspeed condition or is approaching an overspeed condition in response to the parameter, and upon determining that the spool is in the overspeed condition or is approaching the overspeed condition, applying a load to the spool via an electric machine.

In addition to one or more of the features described above, or as an alternative to any of the foregoing embodiments measuring the parameter of the spool further comprises measuring at least one of a rotational speed of the engine spool and a rate of acceleration of the engine spool.

In addition to one or more of the features described above, or as an alternative to any of the foregoing embodiments determining if the spool is in an overspeed condition or is approaching an overspeed condition in response to the parameter further comprises comparing the measured parameter with an overspeed threshold.

In addition to one or more of the features described above, or as an alternative to any of the foregoing embodiments applying the load to the spool via the electric machine further comprises configuring the electric machine in a generator mode.

In addition to one or more of the features described above, or as an alternative to any of the foregoing embodiments applying the load to the spool via the electric machine further comprises connecting at least one energy sink to the electric machine.

In addition to one or more of the features described above, or as an alternative to any of the foregoing embodiments comprising shutting off a flow of fuel to the gas turbine engine.

In addition to one or more of the features described above, or as an alternative to any of the foregoing embodiments applying the load to the spool occurs after shutting off the flow of fuel to the gas turbine engine.

Also disclosed is a method for limiting overspeed of a spool of a gas turbine engine includes detecting a failure of a shaft of the spool, determining a loading of the failed shaft, and applying another load to the failed shaft via an electric machine if the loading on the failed shaft is less than a load threshold.

In addition to one or more of the features described above, or as an alternative to any of the foregoing embodiments the spool further comprises a compressor, a fan, and a turbine operably coupled the shaft, and determining the loading of the failed shaft further comprises determining if at least one of the fan and the compressor is applying a load to the failed shaft.

In addition to one or more of the features described above, or as an alternative to any of the foregoing embodiments comprising determining a position of the failure of the shaft relative to a thrust bearing, wherein the applying another load to the failed shaft is based in part on the position of the failure of the shaft.

In addition to one or more of the features described above, or as an alternative to any of the foregoing embodiments comprising applying the another load to the failed shaft when the position of the failure of the shaft is fore of the thrust bearing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
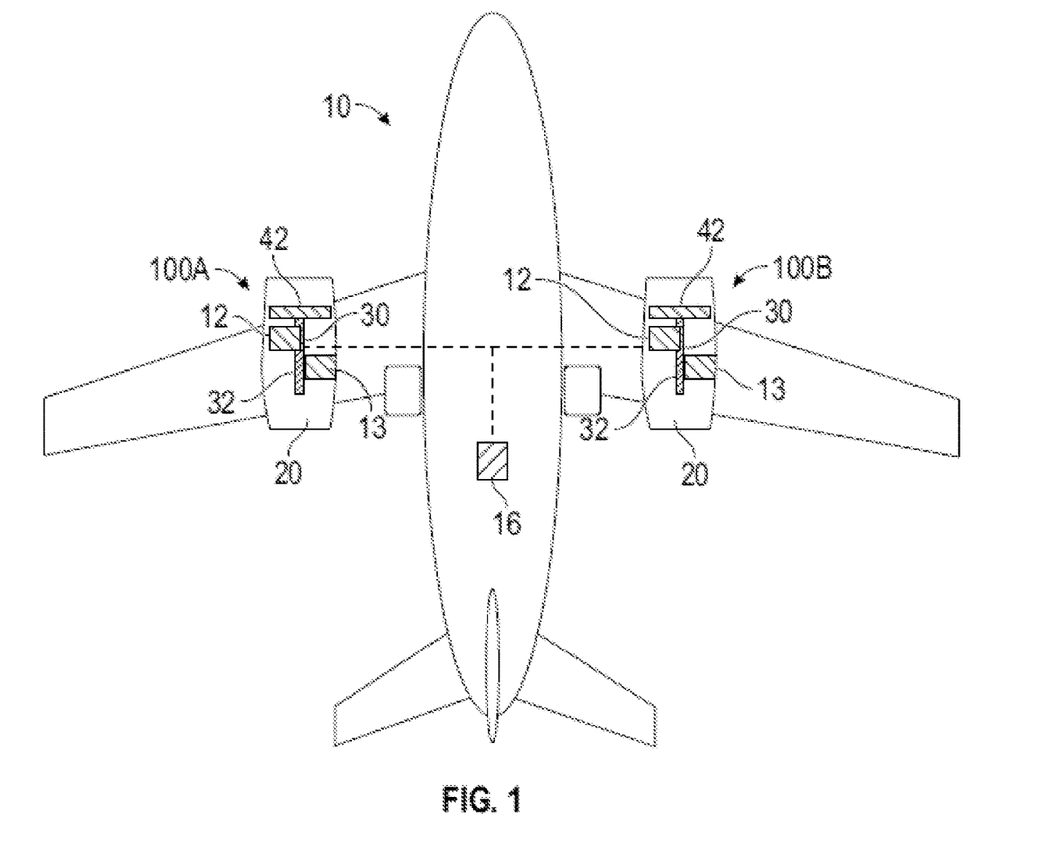
FIG. 1 is a schematic diagram of an aircraft, in accordance with an embodiment of the disclosure.

FIG. 1 schematically illustrates an aircraft 10 that includes a pair of hybrid electric propulsion systems 100A, 100B (also referred to as hybrid gas turbine engines 100A, 100B or hybrid propulsion systems 100A, 100B). Although a fixed wing aircraft is illustrated in the FIG., it should be understood that rotary wing aircraft applications are also contemplated herein. Each of the hybrid electric propulsion systems 100A, 100B includes a gas turbine engine 20 with a low spool 30 configured to drive rotation of a fan 42. Gas turbine engine 20 also includes a high spool 32 that operates at higher speeds and pressures than the low spool 30. A low spool electric machine 12 can extract or add rotational power, for instance, by modifying torque and speed of the low spool 30 and fan 42. A high spool electric machine 13 can be configured to extract or add rotational power to the high spool 32.

At least one power source 16 of the aircraft 10 can provide electrical power to or receive electrical power from the low spool electric machine 12 and/or the high spool electric machine 13 of the gas turbine engines 20 and/or other components of the aircraft 10. The power source 16 can be an energy storage system that stores electrical and/or mechanical energy. For example, the power source 16 can include one or more of a battery, a super capacitor, an ultra-capacitor, a flywheel, and the like. Where the aircraft 10 includes an additional thermal engine (not depicted), such as an auxiliary power unit, the power source 16 can also be coupled to one or more components of the additional thermal engine. The power source 16 can be coupled to other energy producing or consuming systems of the aircraft 10, such as an electrical power distribution system, an environmental control system, an anti-ice/deicing system, and/or other such aircraft systems (not depicted).

Embodiments of the present disclosure control operation of the hybrid electric propulsion systems 100A, 100B to reduce over-speed of one or both of the low spool 30 and the high spool 32.

While the example of FIG. 1 illustrates a simplified example of the gas turbine engine 20, it will be understood that any number of spools can be incorporated, and inclusion or omission of other elements and subsystems are contemplated. Further, systems described herein can be used in a variety of applications and need not be limited to gas turbine engines for aircraft applications.

Figure 2:
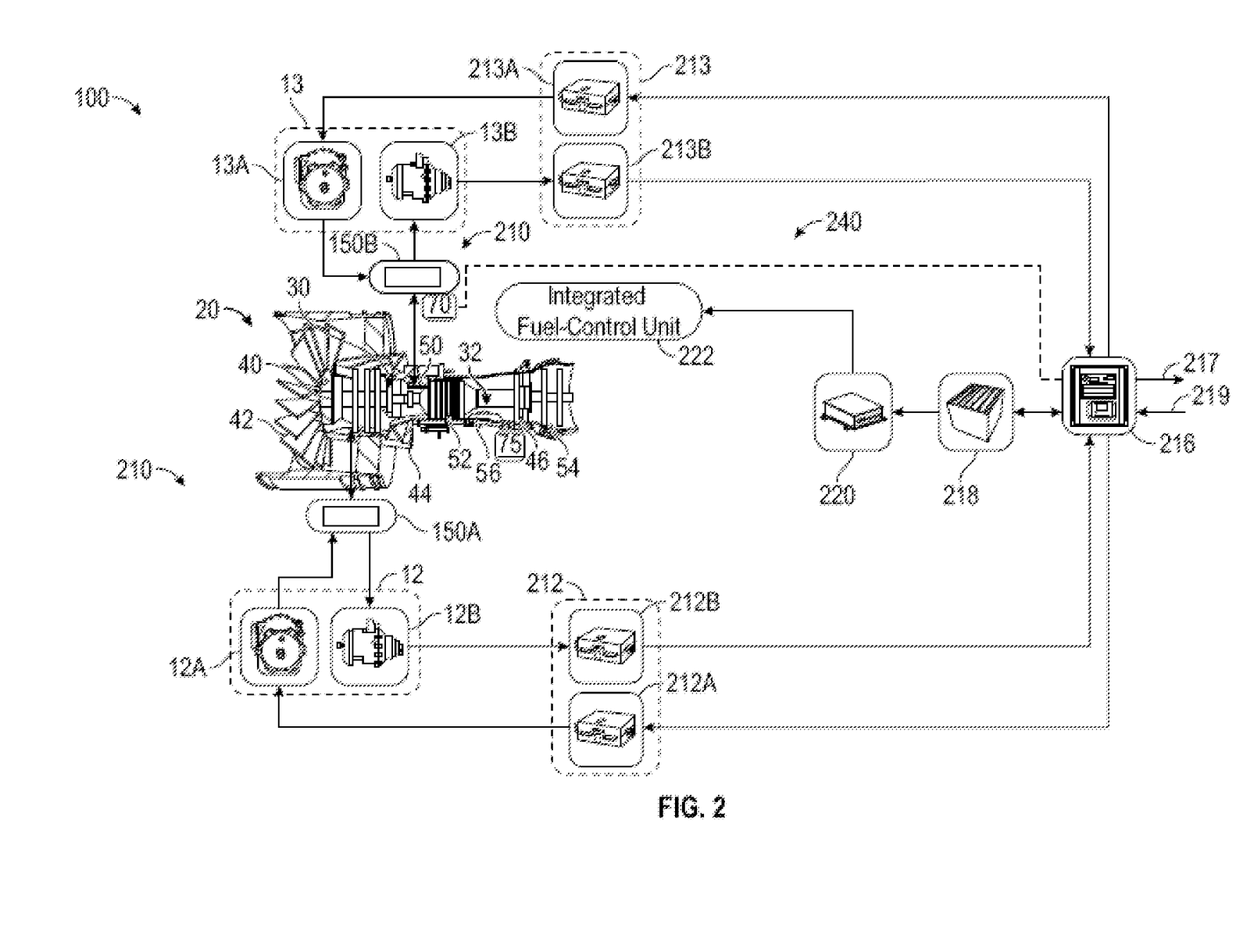
FIG. 2 is a schematic diagram of a hybrid electric propulsion system, in accordance with an embodiment of the disclosure.

FIG. 2 illustrates a hybrid electric propulsion system 100 (also referred to as hybrid gas turbine engine 100, hybrid propulsion system 100, or engine system 100) as a further example of the hybrid electric propulsion system 100A, 100B of FIG. 1. In the example of FIG. 2, the hybrid electric propulsion system 100 includes gas turbine engine 20 operably coupled to an electrical power system 210 as part of a hybrid electric aircraft, such as aircraft 10 of FIG. 1. One or more mechanical power transmissions 150 (e.g., 150A, 150B) can be operably coupled between the gas turbine engine 20 and the electrical power system 210. The gas turbine engine 20 includes one or more spools, such as low spool 30 and high spool 32, each with at least one compressor section and at least one turbine section operably coupled to a shaft (e.g., low pressure compressor 44 and low pressure turbine 46 coupled to inner shaft 40 and high pressure compressor 52 and high pressure turbine 54 coupled to outer shaft 50).

The electrical power system 210 can include a low spool electric machine 12 and a high spool electric machine 13. The low spool electric machine 12 can be configurable between a low spool motor mode of operation and a low spool generator mode of operation. Alternatively, the low spool electric machine 12 can be implemented as a separate low spool electric motor 12A and low spool generator 12B coupled to the mechanical power transmission 150A. Similarly, the high spool electric machine 13 can be configurable between a high spool motor mode of operation and a high spool generator mode of operation. Alternatively, the high spool electric machine 13 can be implemented as a separate high spool electric motor 13A and high spool generator 13B coupled to the mechanical power transmission 150B. The low spool electric machine 12 and high spool electric machine 13 can have a large capacity, such as a megawatt or more.

In the example of FIG. 2, the mechanical power transmission 150A can include a gearbox operably coupled between the inner shaft 40 and the low spool electric machine 12. The mechanical power transmission 150B can include a gearbox operably coupled between the outer shaft 50 and the high spool electric machine 13. The mechanical power transmission 150A, 150B and/or electric machines 12, 13 can include a clutch or other interfacing element(s) to selectively engage or disengage the electric machines 12, 13.

The electrical power system 210 can also include low spool power conditioning electronics 212 and high spool power conditioning electronics 213. The low spool power conditioning electronics 212 can include motor drive electronics 212A and rectifier electronics 212B. Similarly, the high spool power conditioning electronics 213 can include motor drive electronics 213A and rectifier electronics 213B. The motor drive electronics 212A, 213A are operable to condition current to electric motors 12A, 13A (e.g., DC-to-AC converters), respectively. The rectifier electronics 212B, 213B are operable to condition current from the generators 12B, 13B (e.g., AC-to-DC converters), respectively. The low spool power conditioning electronics 212 and high spool power conditioning electronics 213 can interface with an energy storage management system 216 that further interfaces with an energy storage system 218. The energy storage management system 216 can be a bi-directional DC-DC converter that regulates voltages between energy storage system 218 and electronics 212A, 212B, 213A, 213B. The energy storage system 218 can include one or more energy storage devices, such as a battery, a super capacitor, an ultra-capacitor, and the like. The energy storage management system 216 can facilitate various power transfers within the hybrid electric propulsion system 100. The energy storage management system 216 may also transfer power to one or more electric motors on the aircraft 10 of FIG. 1, or to external loads 217 and receive power from one or more external power sources 219 (e.g., power source 16 of FIG. 1, aircraft power, auxiliary power unit power, cross-engine power, and the like).

A power conditioning unit 220 and/or other components can be powered by the energy storage system 218. The power conditioning unit 220 can distribute electric power to support actuation and other functions of the gas turbine engine 20. For example, the power conditioning unit 220 can power an integrated fuel control unit 222 to control fuel flow to the gas turbine engine 20. The power conditioning unit 220 can also power a plurality of actuators (not depicted), such as bleed actuators, vane actuators, and the like.

One or more accessories 70 can also be driven by or otherwise interface with the gas turbine engine 20. Examples of accessories 70 can include oil pumps, fuel pumps, and other such components. As one example, the accessories 70 include an oil pump driven through gearing, such as mechanical power transmission 150B, in response to rotation of the high spool 32 and/or the high spool electric motor 13A. Alternatively, accessories 70 can be electrically driven through power provided by the energy storage management system 216, such as from energy storage system 218 for example, or other such sources of electrical power.

Engagement and operation of the low spool electric motor 12A, low spool generator 12B, high spool electric motor 13A, and high spool generator 13B can change depending upon an operating state of the gas turbine engine 20 and any commands received. Collectively, any effectors that can change a state of the gas turbine engine 20 and/or the electrical power system 210 may be referred to as hybrid electric system control effectors 240. Examples of the hybrid electric system control effectors 240 can include the electric motors 12A, 13A, generators 12B, 13B, integrated fuel control unit 222, and/or other elements (not depicted).

Figure 3:
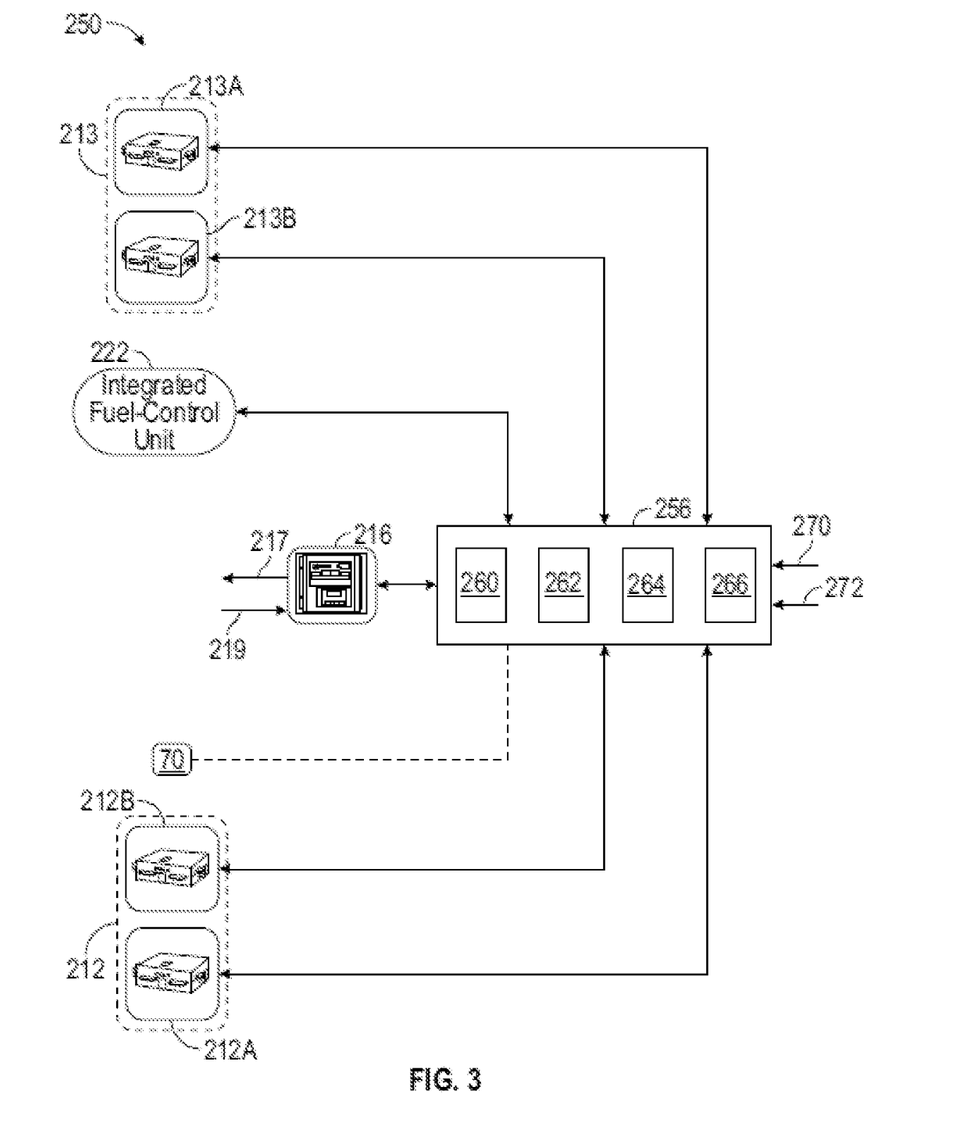
FIG. 3 is a schematic diagram of control signal paths of a hybrid electric propulsion system, in accordance with an embodiment of the disclosure.

FIG. 3 is a schematic diagram of control signal paths 250 of the hybrid electric propulsion system 100 of FIG. 2 and is described with continued reference to FIGS. 1 and 2. A controller 256 can interface with the low spool power conditioning electronics 212, high spool power conditioning electronics 213, energy storage management system 216, integrated fuel control unit 222, accessories 70, and/or other components (not depicted) of the hybrid electric propulsion system 100. In embodiments, the controller 256 can control and monitor for fault conditions of the gas turbine engine 20 and/or the electrical power system 210. For example, the controller 256 can be integrally formed or otherwise in communication with a full authority digital engine control (FADEC) of the gas turbine engine 20. Alternatively, the controller 256 can be an aircraft level control or be distributed between one or more systems of the aircraft 10 of FIG. 1. In embodiments, the controller 256 can include a processing system 260, a memory system 262, and an input/output interface 264.

The controller 256 can also include various operational controls, such as a hybrid engine control 266 that controls the hybrid electric system control effectors 240, for instance based on an operating mode 270, or a command 272. The operating mode 270 can indicate whether the aircraft 10 is in a pre-takeoff taxi, takeoff, climb, cruise, descent, landing, or post-landing taxi mode, or other such operating modes, for example. The operating mode 270 can be determined by a system of the aircraft 10 based on tracking various parameters, such as weight-on-wheels, altitude, velocity, and other such aircraft parameters.

The processing system 260 can include any type or combination of central processing unit (CPU), including one or more of: a microprocessor, a digital signal processor (DSP), a microcontroller, an application specific integrated circuit (ASIC), a field programmable gate array (FPGA), or the like. The memory system 262 can store data and instructions that are executed by the processing system 260. In embodiments, the memory system 262 may include random access memory (RAM), read only memory (ROM), or other electronic, optical, magnetic, or any other computer readable medium onto which is stored data and algorithms in a non-transitory form. The input/output interface 264 is configured to collect sensor data from the one or more system sensors and interface with various components and subsystems, such as components of the motor drive electronics 212A, 213A, rectifier electronics 212B, 213B, energy storage management system 216, integrated fuel control unit 222, accessories 70, and/or other components (not depicted) of the hybrid electric propulsion system 100. The controller 256 provides a means for controlling the hybrid electric system control effectors 240 using a hybrid engine control 266 that can be dynamically updated during operation of the hybrid electric propulsion system 100. The means for controlling the hybrid electric system control effectors 240 can be otherwise subdivided, distributed, or combined with other control elements.

Figure 4:
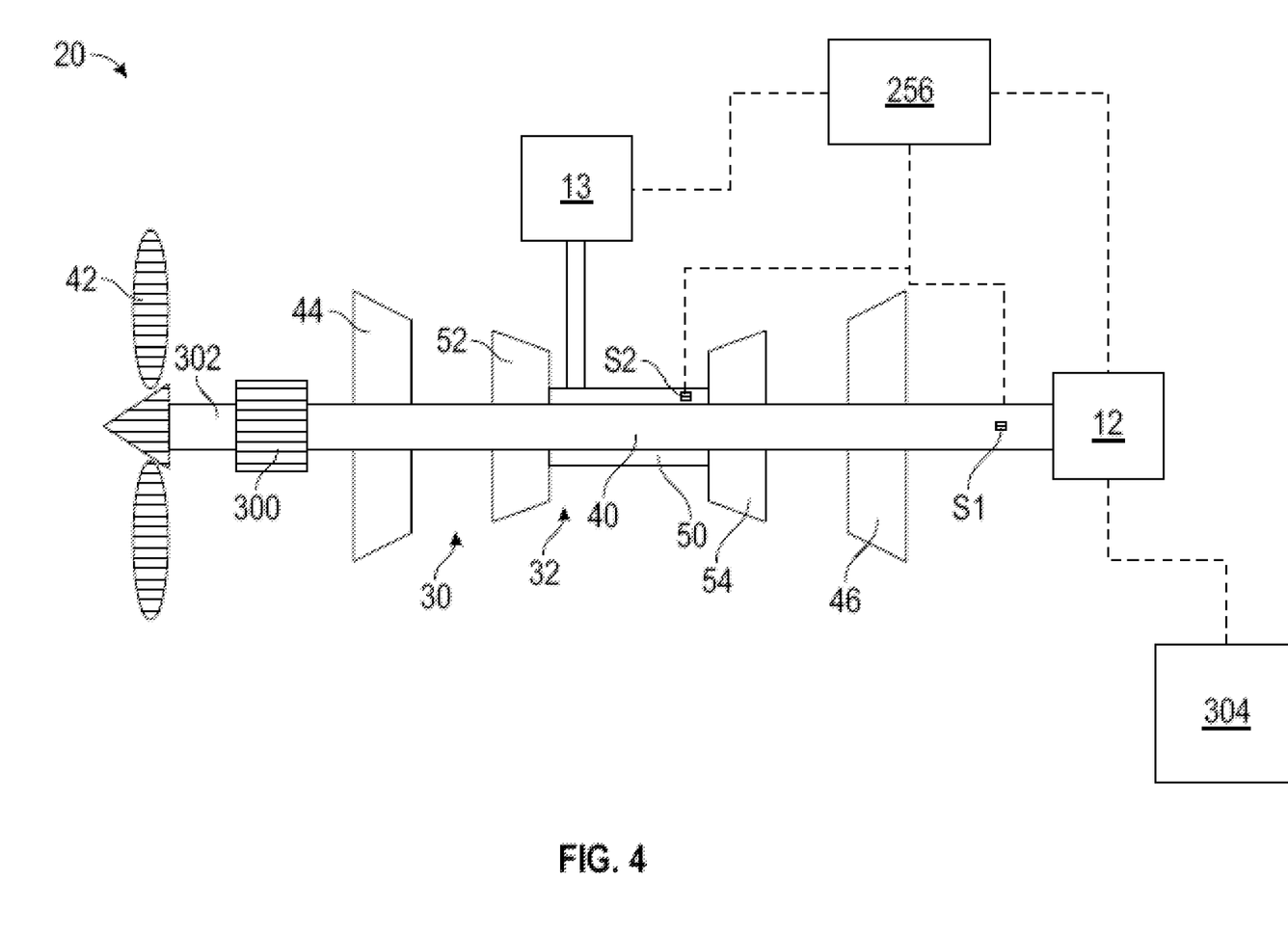
FIG. 4 is a schematic diagram of a low spool and high spool of a gas turbine engine in accordance with an embodiment of the disclosure.

During operation of the gas turbine engine 20, various failures may occur that cause one or more of the spools 30, 32 of the gas turbine engine 20 to accelerate to a rotational speed exceeding a designed overspeed limit. Examples of such failures include but are not limited to a failure of a fuel metering valve associated with the fuel control unit 222, a failure of the spool shaft, and unloading of the spool 30, 32. In an embodiment, the electrical power system 210 is used to control, and in some embodiments, prevent an overspeed condition of the hybrid electric propulsion system 100. With reference now to FIGS. 4-7, a response of the hybrid electric propulsion system 100 to detection of the occurrence of an overspeed condition or that a portion of the hybrid electric propulsion system 100 is approaching, but has not reached an overspeed condition is described in more detail. FIG. 4 illustrates a simplified schematic diagram of a gas turbine engine 20 and a portion of the electrical power system 210. As shown, the gas turbine engine 20 includes a high spool 32 including a high pressure compressor 52 and a high pressure turbine 54 operably coupled by a high spool shaft 50. Similarly, the gas turbine engine 20 includes a low spool 30 including a low pressure compressor 44 and a low pressure turbine 46 operably coupled by a shaft 40. The fan 42 of the gas turbine engine 20 may be directly driven by the low spool 30, or as shown, may be connected thereto via a mechanical power transmission 300 and a fan shaft 302.

At least one sensor may be used to measure an operational parameter of the gas turbine engine 20. In an embodiment, the at least one sensor includes a first sensor S1 and a second sensor S2 associated with the low spool 30 and the high spool 32, respectively. In the illustrated, non-limiting embodiment, the at least one sensor includes a first speed sensor S1 mounted to the low spool shaft 40 and a second speed sensor S2 mounted to the high spool shaft 50. Alternatively, or in addition, the at least one sensor S1, S2 may be operable to measure a vibration of the low spool, high spool or another component of the gas turbine engine 20. In yet another embodiment, the at least one sensor may include a sensor capable of monitoring a fuel flow to the gas turbine engine 20 or may include a pressure sensor, for example to monitor a pressure within the fuel system. It should be understood that the sensors described herein are intended as an example only and that embodiments having a different number or type of sensors and/or embodiments where the sensors are mounted to any component of the gas turbine engine 20 are also contemplated herein.

The data collected by the at least one sensor is evaluated to detect if the gas turbine engine 20 is experiencing an overspeed condition. Although the detection of an overspeed condition as described herein is used to determine if one or more of the spools 30, 32 is actively in an overspeed condition, in an embodiment, the detection may alternatively or additionally be used to determine if one or more of the spools 30, 32 is approaching, but has not yet reached an overspeed condition.

To determine if one or more of the spools 30, 32 is experiencing an overspeed condition or that an overspeed condition of one or more of the spools 30, 32 is imminent, the controller 256 is configured to compare data provided by the sensors with a respective limit or threshold associated with an overspeed condition. For example, in an embodiment, sensors S1 and S2 provide continuous or intermittent signals to the controller 256 indicating a speed of each of the spools 30, 32. In an embodiment, the speed of one of the spools 30, 32 must exceed the overspeed limit for a continuous period of time for example for the spool to be in an overspeed condition. However, in other embodiments, any instance where the speed of a spool 30, 32 exceeds the overspeed limit may be sufficient to indicate an overspeed condition. Further embodiments where the speed of one of the spools 30, 32 is less than, but within a predetermined range of the overspeed limit, such as within about 5% of the overspeed limit for example, for a continuous period of time, the controller 256 may determine that one of the spools is rapidly approaching an overspeed condition. In other embodiments, any instance where the speed of one of the spools 30, 32 is less than, but within the predetermined range of the overspeed limit may be sufficient to indicate that the spool 30, 32 will be in an overspeed condition imminently.

Alternatively, or in addition, the controller 256 may monitor, such as via an accelerometer, or may calculate, such as using the previously described speed sensors, a rate of acceleration of one or more of the spools 30, 32 of the gas turbine engine 20. In such embodiments, the controller 256 similarly compares the rate of acceleration of a spool 30, 32 to a limit associated with an overspeed condition. This comparison may be used to determine if one of the spools 30, 32 is approaching an overspeed condition, such as if the acceleration exceeds a first overspeed limit, and/or may be used to determine if one of the spools is in an overspeed condition, such as if the acceleration exceeds a second overspeed limit. In each of these embodiments, the determination may be made using only a single measurement or calculation of the rate of acceleration of one of the spools 30, 32, or alternatively, the rate of acceleration of one of the spools 30, 32 may need to exceed one of the first and second overspeed limits for at least a minimum period of time to indicate that the spool 30, 32 is approaching or is in an overspeed condition.

Regardless of which parameter associated with operation of the gas turbine engine 20 is being monitored, upon positively determining that the gas turbine engine 20 is in or is approaching an overspeed condition, the controller 256 may send a command to the fuel control unit 222 to shutoff the flow of fuel to the gas turbine engine 20. Because at least some fuel is typically present in the conduits connecting the fuel system to the gas turbine engine 20, even after the flow of fuel to the engine has been shutoff, the gas turbine engine 20 may not immediately begin to slowdown. In addition, rotor inertia may limit the rate of deceleration of the gas turbine engine 20. Accordingly, depending on the conditions of the engine and/or the aircraft, it may be desirable to actively slow the rotational speed of the spool 30, 32 after the fuel flow to the gas turbine engine 20 has been shutoff. For example, in an embodiment, the electric machine 12, 13 associated with the respective spool 30, 32 experiencing an overspeed condition is used to slow the spool 30, 32 by extracting rotational energy therefrom in the form of electrical energy.

In an embodiment, in response to determining that one of the spools 30, 32 of the gas turbine engine 20 is experiencing an overspeed condition, the controller 256 configures at least one of the low spool electric machine 12 and the high spool electric machine 13 in a generator mode. This configuration of the electric machine 12, 13 in the generator mode may or may not include mechanically connecting the electric machine 12, 13, to a respective shaft 40, 50 of the gas turbine engine 20, such as via a clutch for example. Further, configuring the respective electric machine 12, 13 in a generator mode includes applying another load to the shaft, such as by connecting an electrical load or energy sink, illustrated schematically at 304, to the generator to add rotor drag and to draw power therefrom. The electrical load or energy sink 304 may be provided by another component of the hybrid-electric propulsion system architecture and/or is already part of the aircraft 10. Examples of the electrical loads or energy sinks 304 that may be connected to the generator include, but are not limited to, a battery, a capacitor, and an electrical anti-ice system. The controller 256 may be configured to evaluate the state of charge of one or both of the battery and the capacitor to determine whether either component has the capability to safely take any of the energy load from the generator before connecting the battery or capacitor to the generator. As has not previously been appreciated, the electrical anti-ice system may be capable of temporarily receiving a large rush of current without exceeding suitable temperatures, and therefore may be used as a transient energy sink.

In an embodiment, the controller 256 is configured to apply an energy sink logic to select which energy sink 304 should be used from the plurality of available energy sinks 304. In such embodiments, parameters such as operating conditions, flight regime, and predicted response time may be used when selecting one or more of the energy sinks 304 to receive electrical current from a generator during an overspeed condition.

Figure 5:
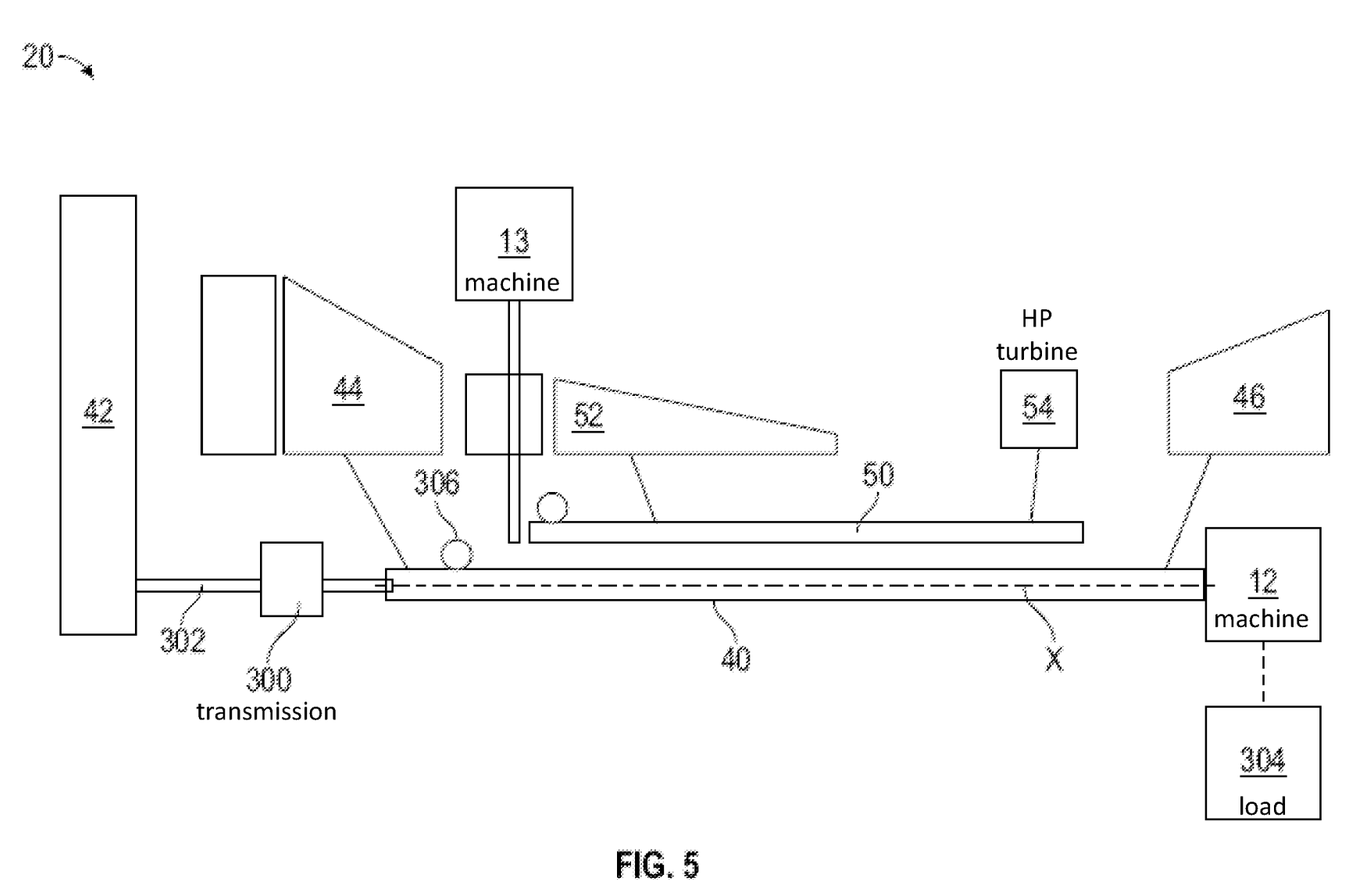
FIG. 5 is a schematic diagram of a portion of an engine having a geared fan in accordance with an embodiment of the disclosure.
Figure 6:
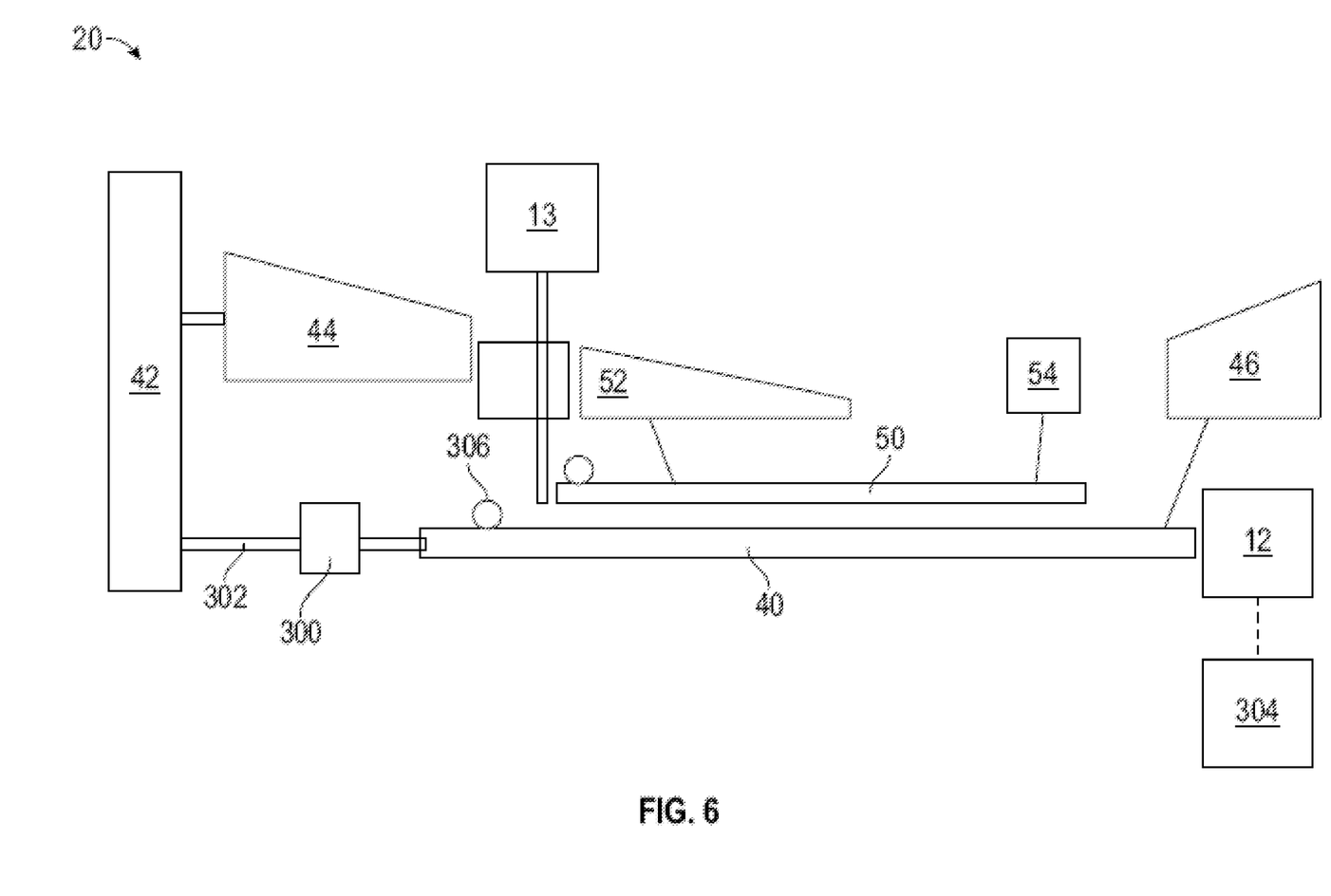
FIG. 6 is a schematic diagram of a portion of an engine having a geared fan in accordance with another embodiment of the disclosure.
Figure 7:
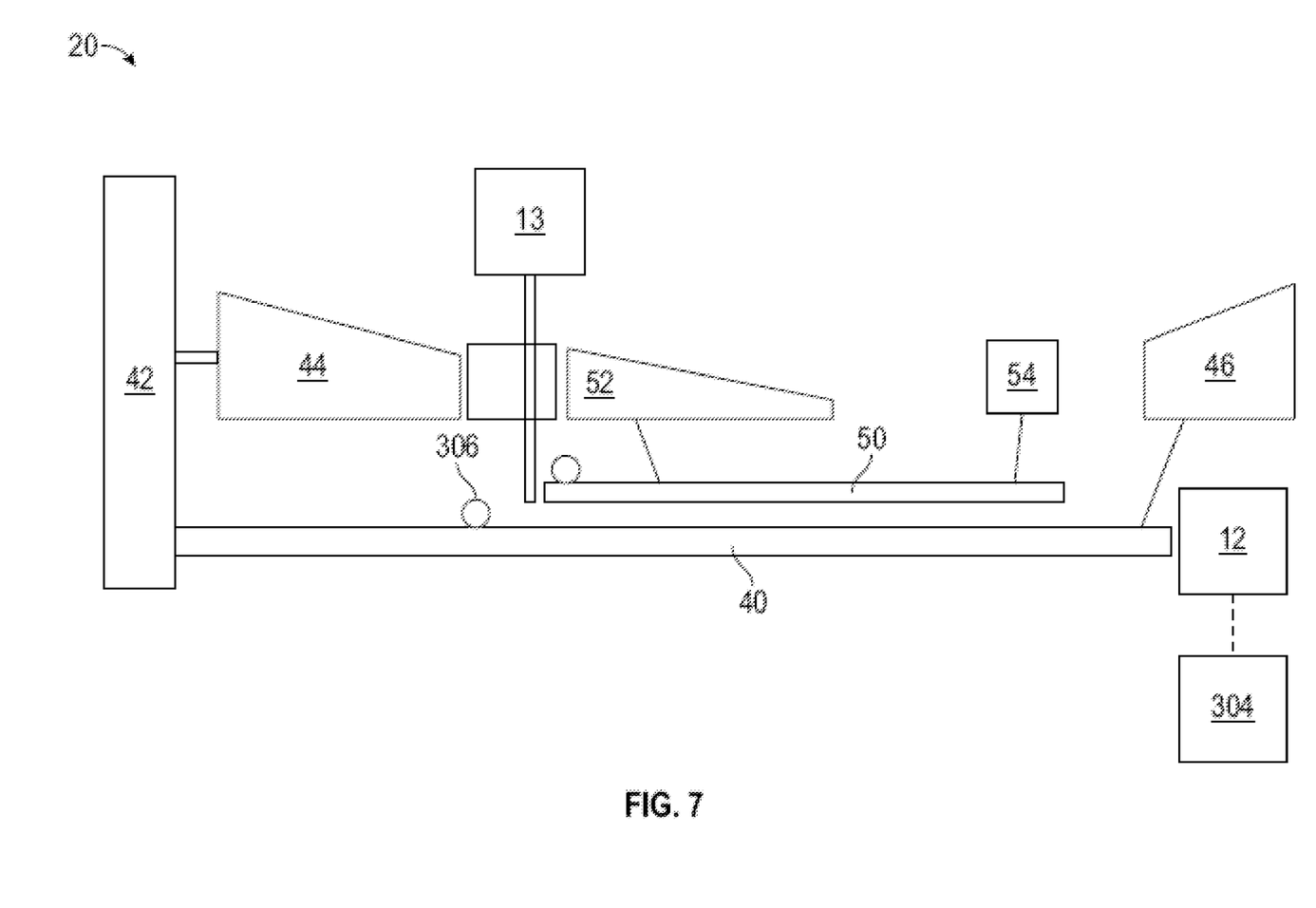
FIG. 7 is a schematic diagram of a portion of an engine having a directly driven fan in accordance with another embodiment of the disclosure.

With reference now to FIGS. 5-7, various embodiments for controlling overspeed of a spool 30, 32 in the event of shaft failure are provided. As is known, the low spool shaft 40 is responsible for driving rotation of both the low pressure compressor 44 and the fan 42. The fan 42 may be responsible for approximately 80% of the load applied to the low spool shaft 40 and the low pressure compressor 44 may be responsible for about 20% of the load acting on the low spool shaft 40. However, embodiments where the fan 42 is responsible for anywhere from 60-95% of the load applied to the low spool shaft 40 are also contemplated herein.

In the non-limiting embodiment of FIG. 5, the fan 42 is operably coupled to the low spool shaft 40 via a geared transmission 300. As a result, the fan 42 and the low pressure compressor 44 are separately coupled to the low spool shaft 40. Further, in such embodiments, the fan 42 is typically configured to rotate at a different speed, for example a slower speed, than the low spool shaft 40. In the embodiments of FIGS. 6 and 7, the fan 42 and the low pressure compressor 44 are connected and driven by the low spool shaft 40 in unison. The fan 42 and the low pressure compressor 44 may be driven together via a geared transmission 300, as shown in FIG. 6, or alternatively, the fan 42 and low pressure compressor 44 may be directly driven by the low spool shaft 40 as shown in FIG. 7. In each of the illustrated embodiments, the low spool 30 includes at least one thrust bearing 306 configured to withstand a thrust load acting on the low spool shaft 40.

In each of the illustrated embodiments, the loading applied to the low spool shaft 40 after a failure thereof is determined based on the configuration of the system 20 and the position of the failure relative to the thrust bearing 306. If the low spool shaft fails 40, for example shears, at a location aft of the thrust bearing 36, regardless of the configuration of the system 20, the thrust acting on the low spool shaft 40 will cause the blades of the low pressure turbine 46 to translate rearwardly along the shaft axis X. As a result, the blades of the low pressure turbine 46 will engage and clash with the stationary low pressure turbine vanes. This engagement between the low pressure turbine blades and the low pressure turbine vanes will prevent the low spool shaft 40 from actually reaching an overspeed condition.

In embodiments where the fan 42 is connected to the low spool shaft 40 separately from the low pressure compressor 44, such as by a fan shaft 302 and/or a geared transmission 300 for example, a failure of the fan shaft 302 removes the load applied by the fan 42 from the low spool shaft 40. In such embodiments, only the loading of the low pressure compressor 44 remains applied to the low spool shaft 40. Accordingly, the load of the low pressure compressor 44 may exceed a minimum load threshold and therefore may be sufficient to prevent overspeed of the low spool shaft 40 during the period of time required to not only shut off the fuel flow to the gas turbine engine 20, but also to use the remaining fuel present within the conduits connected to the gas turbine engine 20.

However, in other embodiments where the fan 42 and the low pressure compressor 44 are coupled and configured to rotate in unison, if a failure of the low spool shaft 40 occurs forward of the thrust bearing 306, both the load applied by the fan 42 and the load applied by the low pressure compressor 44 is removed from the low spool shaft 40. In such embodiments, the load acting on the low spool shaft is less than a load threshold. As a result, the time required for the low spool shaft 40 to reach an overspeed condition is shorter than in instances where a partial load is still applied to the low spool shaft 40 after the failure has occurred. In such embodiments, upon detection of the shaft failure, the controller 256 may automatically configure the low spool electric machine 12 in the generator mode to extract rotational energy from the low spool shaft 40. Further, as previously noted, configuring the electric machine 12 in a generator mode includes connecting an electrical load or energy sink to the generator to draw power therefrom.

The electric machines 12, 13 of the hybrid electric propulsion system 100 described herein may be used to mitigate and/or prevent overspeed of a rotational component of a gas turbine engine 20 by selectively applying a load to the rotational component to reduce the speed thereof. By using the electrical machine to apply an additional load to the rotational component, the electrical machine provides an additional safety measure to limit the speed of an engine spool prior to shutdown of the engine.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An engine system of an aircraft, the engine system comprising:
    a gas turbine engine comprising at least one spool and at least one electric machine operably coupled with the at least one spool; and
    a controller configured to:
        detect if the at least one spool of the gas turbine engine is in or is approaching an overspeed condition;
        shutoff a flow of fuel to the gas turbine engine; and
        apply a load to the at least one spool via the at least one electric machine after shutoff of the flow of fuel.

2. The engine system of claim 1, wherein the controller is further configured to monitor a parameter of the at least one spool and compare the parameter of the at least one spool to an overspeed threshold.

3. The engine system of claim 2, wherein the parameter is a rotational speed of the at least one spool.

4. The engine system of claim 2, wherein the parameter is a rate of acceleration of the at least one spool.

5. The engine system of claim 2, wherein application of the load to the at least one spool is performed when the parameter is equal to or exceeds the overspeed threshold.

6. The engine system of claim 1, wherein the at least one electric machine is configurable between a motor mode and a generator mode, and the at least one electric machine is configured to apply the load to the at least one spool when in the generator mode.

7. The engine system of claim 1, wherein the at least one spool includes a low spool and a high spool and the at least one electric machine includes a low spool electric machine operably coupled to the low spool, and a high spool electric machine operably coupled to the high spool.

8. The engine system of claim 1, wherein the controller is further configured to connect at least one energy sink to the at least one electric machine to apply the load to the at least one spool.

9. The engine system of claim 8, wherein the at least one energy sink includes one or more of a battery, a capacitor, and an anti-ice/deicing system.

10. A method for limiting overspeed of a spool of a gas turbine engine comprising:
  measuring a parameter of the spool;
  determining if the spool is in an overspeed condition or is approaching an overspeed condition in response to the parameter; and
  upon determining that the spool is in the overspeed condition or is approaching the overspeed condition, shutting off a flow of fuel to the gas turbine engine and applying a load to the spool via an electric machine, wherein applying the load to the spool occurs after shutting off the flow of fuel.

11. The method of claim 10, wherein measuring the parameter of the spool further comprises measuring at least one of a rotational speed of the engine spool and a rate of acceleration of the engine spool.

12. The method of claim 10, wherein determining if the spool is in an overspeed condition or is approaching an overspeed condition in response to the parameter further comprises comparing the measured parameter with an overspeed threshold.

13. The method of claim 10, wherein applying the load to the spool via the electric machine further comprises configuring the electric machine in a generator mode.

14. The method of claim 13, wherein applying the load to the spool via the electric machine further comprises connecting at least one energy sink to the electric machine.

15. A method for limiting overspeed of a spool of a gas turbine engine comprising:
  detecting a failure of a shaft of the spool;
  determining a loading of the failed shaft;
  applying another load to the failed shaft via an electric machine if the loading on the failed shaft is less than a load threshold; and
  determining a position of the failure of the shaft relative to a thrust bearing, wherein the applying another load to the failed shaft is based in part on the position of the failure of the shaft.

16. The method of claim 15, wherein the spool further comprises a compressor, a fan, and a turbine operably coupled the shaft, and determining the loading of the failed shaft further comprises determining if at least one of the fan and the compressor is applying a load to the failed shaft.

17. The method of claim 15, further comprising applying the another load to the failed shaft when the position of the failure of the shaft is fore of the thrust bearing.

* * * * *